United States Patent [19]

Kunz

[11] 4,430,925
[45] Feb. 14, 1984

[54] PRESSURE VESSEL WITH IMPROVED SECURITY

[76] Inventor: Paul Kunz, Deishardtstr. 3, D-5419 Döttesfeld, Fed. Rep. of Germany

[21] Appl. No.: 410,550

[22] Filed: Aug. 23, 1982

Related U.S. Application Data

[63] Continuation of Ser. No. 209,428, Nov. 24, 1980, abandoned.

[30] Foreign Application Priority Data

Nov. 30, 1979 [DE] Fed. Rep. of Germany ....... 2948360

[51] Int. Cl.³ .......................... A47J 27/09; A23N 7/00
[52] U.S. Cl. ......................................... 99/330; 99/337; 99/348; 99/409; 99/468; 99/475; 99/477; 99/492; 99/516; 99/584
[58] Field of Search ................. 99/330, 348, 403, 418, 99/467, 468, 473–475, 477–479, 483, 409, 487, 492, 516, 534, 584, 337; 219/440; 126/369

[56] References Cited

U.S. PATENT DOCUMENTS

| | | | |
|---|---|---|---|
| 3,733,998 | 5/1973 | Vischer | 99/330 |
| 3,992,984 | 11/1976 | Treiber | 99/330 |
| 4,091,722 | 5/1978 | Kunz | 99/584 |

FOREIGN PATENT DOCUMENTS

| | | | |
|---|---|---|---|
| 2032796 | 4/1970 | Fed. Rep. of Germany | 99/584 |
| 2038166 | 12/1978 | United Kingdom | 99/516 |

*Primary Examiner*—Timothy F. Simone
*Attorney, Agent, or Firm*—Robert T. Gammons

[57] ABSTRACT

A rotatably supported pressure vessel is disclosed for treating product under high pressure. A pressure medium is supplied to the pressure vessel through two separate supply conducts feeding the pressure medium under different pressures. When supplying the pressure medium to the pressure vessel, in a first step the pressure medium is supplied under lower pressure. During this step, the pressure within the pressure vessel is monitored. When a predetermined pressure is reached indicating that the feed opening of the pressure vessel is completely closed by an associated cover, the pressure medium is supplied under high pressure. The pressure medium source may either comprise a high pressure supply and a lower pressure supply, or two separate supply conducts of substantially different cross-sectional areas are provided to provide different pressure differentials.

14 Claims, 1 Drawing Figure

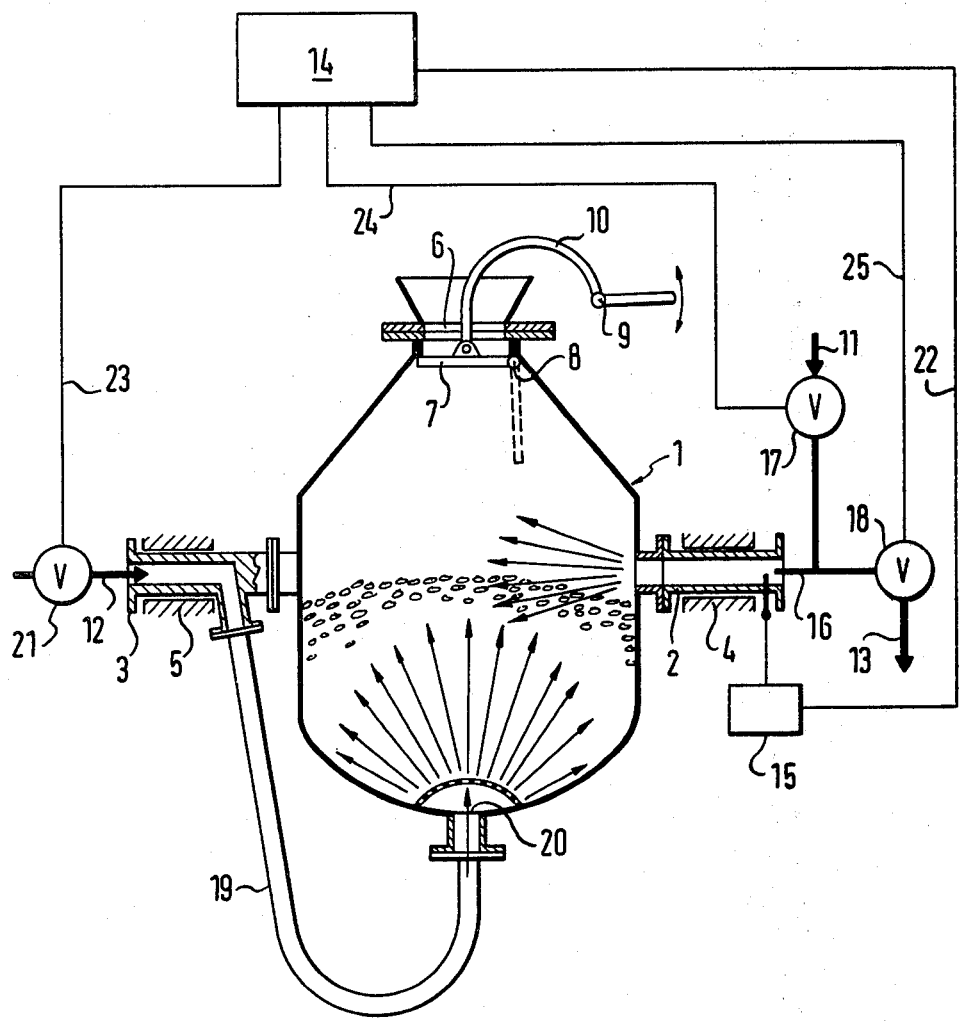

PRESSURE VESSEL WITH IMPROVED SECURITY

This is a continuation, of application Ser. No. 209,428 filed Nov. 24, 1980, abandoned.

BACKGROUND OF THE INVENTION

This invention generally relates to rotatably supported pressure vessels for treatment of product such as cooking food, peeling fruit etc. More particularly, the invention relates to a rotatably supported pressure vessel with improved security.

German Offenlegungsschrift No. 2,641,350 discloses a rotatably supported pressure vessel having a feed opening for feeding product into the vessel to be treated therein and a cover adapted to close the feed opening. Two separate supply conducts are provided for supplying the pressure medium to the pressure vessel. The two supply conducts are adapted to feed the pressure medium to the pressure vessel under different pressures. During supplying pressure medium to the pressure vessel, the pressure medium is first supplied under lower pressure and subsequently under high pressure. The cover for closing the feed opening may be operated by a device mounted outside the pressure vessel. When the pressure medium is first supplied under low pressure, any residual air within the pressure vessel will be vented. After a predetermined period, the pressure medium is supplied under operating pressure. With pressure vessels of this kind, there is a considerable risk that the pressure medium may be supplied under high operating pressure although the cover is not or not completely closed. In view of the very high operating pressures of 15 atmospheres gauge and more this would be very dangerous. German Pat. No. 2,325,293 solves this security problem by operating a device for closing the cover of the pressure vessel which is mounted within the latter by the same pressure medium so that the pressure medium can only penetrate into the pressure vessel after the cover has been moved into its closing position.

OBJECTS OF THE INVENTION

It is a primary object of the invention to provide a pressure vessel with improved security.

It is a further object of the invention to provide an improved security pressure vessel in which the pressure medium is supplied under operating pressure only after a predetermined pressure has been established within the pressure vessel indicating that the feed opening is completely closed by the associated cover.

It is a still further object of the invention to provide an improved security pressure vessel in which the device for operating the cover of the feed opening to the closing position may be operated by a separate pressure medium.

SUMMARY OF THE INVENTION

According to the present invention, the pressure vessel has a feed opening for feeding products into the pressure vessel to be treated therein. The feed opening may be closed by an associated cover operated by a motor device such as a piston cylinder unit supplied with operating medium from a separate pressure medium source. First and second pressure medium supply means are provided for supplying pressure medium to the pressure vessel. Control means for actuating the first and second supply means to feed the pressure medium to the pressure vessel are provided. The supply means are controlled for successive operation, i.e., in a first stage only the second supply means is operative, and subsequently the first supply means will be operative. Pressure sensing means sense the pressure within the pressure vessel and generate an output signal representative of the pressure, the output signal being fed to the control means. The control means control the first supply means in a manner to establish connection between a pressure medium source and the pressure vessel only after the output signal indicates a predetermined pressure within the pressure vessel. While the second supply means supply the pressure medium under a lower pressure, the first supply means supply the pressure medium under the full operating pressure. The predetermined pressure within the pressure vessel will only be reached in case the feed opening is well closed by its associated cover. This is the condition to safely operate the pressure vessel with the full operating pressure.

DESCRIPTION OF A PREFERRED EMBODIMENT

Preferred embodiments of the present invention will now be described by way of example and without restriction of the invention to the embodiments, with reference to the drawing which shows a partly cross-sectional, schematic view of the pressure vessel and an associated control and pressure medium supply circuit.

The pressure vessel 1 is rotatably supported about its transverse axis by means of shafts 2, 3 flanged to the pressure vessel and supported in bearings 4,5. A cover 7 is provided inside of the feed opening 6 and is mounted in a manner to be pivotable about a support 8. The cover 7 is moved by means of a lever 10 mounted on a pivot axis 9 into the closed position as shown or into the opening position shown with broken lines. The pivoting movements of the lever may be controlled by a double acting piston cylinder device. The pressure medium operating this piston cylinder device and the pressure medium to be supplied to the pressure vessel may be derived from separate pressure medium sources.

The shaft 2 is connected with a conduct 16 not rotating with the pressure vessel which is mounted within the shaft 2 in a slide bearing not shown and which may be sealed in conventional manner by a stuffing-box packing or by a sealing ring. This stationary conduct may be connected through a valve 17 with a first supply conduct 11 and through a valve 18 with a venting conduct 13 used for venting the pressure vessel. Shaft 3 receives a second supply conduct 12 not rotating with the pressure vessel and supported within the shaft 3 through slide bearings and sealed by a packing or a sealing ring. The space within the hollow shaft 3 is connected with an opening 20 at the bottom of the pressure vessel 1 through a conduct 19 flanged to the shaft 3 and to another flange provided at the bottom of the pressure vessel. The opening and closing of the second supply conduct 12 is controlled by a valve 21.

A pressure sensing device 15 is provided on the shaft 2 for sensing and indicating the pressure within the pressure vessel 1 through the space inside the shaft. The output signal of the pressure sensing device is fed to a control device 14 through line 22, the control device 14 having outputs connected with valves 21, 17 and 18 through lines 23, 24 and 25, respectively.

The cross-sectional areas of the supply conduct 12, the space within the shaft 3 and the conduct 19 are substantially smaller than those of the first supply conduct 11 and the space within the shaft 2. The supply conduct 12 is connected with the pressure medium source in such a manner to supply the pressure medium through this conduct under substantially lower pressure than the operating pressure supplied through the first supply conduct 11, due to the reduced cross-sectional area.

In accordance with a preferred embodiment, the diameter of the supply conduct 12 and/or the conduct 19 is 30 mm, the diameter of supply conduct 11 is 125 mm and the diameter of the feed opening 6 is 400 mm.

The above disclosed pressure vessel is particularly useful as a steam peeler. In those steam peelers, the operating pressure is within a range from 10 to 15 atmospheres gauge. The steam supplied through the supply conduct 12 will penetrate into the pressure vessel under a substantially lower pressure of e.g. 1 atmosphere gauge, due to the pressure release and increasing volume upon penetrating into the pressure vessel. The steam will expel any residual air within the pressure vessel. After expelling the air from the pressure vessel, it is completely closed by moving the cover 7 into the closed position, and the steam is supplied through supply conduit 11 under operating pressure.

In accordance with another embodiment the steam supplied through the second supply conduct 12 has a substantially lower pressure than the operating pressure, i.e. 1 atmosphere gauge for example. To this end, a throttling device may be provided between the pressure medium source and the pressure vessel. In this embodiment, it is not required that the first supply conduct 11 and the second supply conduct 12 and/or the conduct 19 have different cross-sectional areas.

In the above disclosed embodiments the pressure medium is fed through two separate conducts 11, 12. However, the pressure medium may be supplied through a single conduct, and suitable means are provided for modifying the cross-sectional area of the conduct. To expel residual air within the pressure vessel, the pressure medium is first supplied through a smaller cross-sectional area of the conduct. Subsequently, the pressure medium for treatment of the product is supplied through the large cross-sectional area of the supply conduct. The cross-sectional area of the conduct may e.g. be modified through a throttling valve.

The control device 14 is adapted to first open valve 21 whilst valve 17 is closed, while valve 18 is either closed or opened during a short initial period. After valve 18 was closed for a predetermined period and steam has been fed during a predetermined period to the pressure vessel through supply conduct, a pressure will have been established within the pressure vessel corresponding to a pressure value which is preadjusted at the control device 14, provided that the cover 7 is completely closed. When this pressure has been reached, the pressure sensing device 15 supplies a signal to the control device 14 causing the latter to open valve 17 and closing valve 21. Now, the pressure vessel is ready for establishing the final operating pressure therein.

However, should the cover 7 not be completely closed when valve 17 is still closed and valve 21 is opened, the predetermined pressure will never be reached within the pressure vessel, as the steam will escape into the environment through opening 6 after penetrating into the pressure vessel through opening 20, and also in view of the fact that the cross-sectional areas of the pressure vessel and of the feed opening are substantially larger than the cross-sectional area of conduct 19. In case the preadjusted pressure value is not reached, valve 17 will be prevented from being opened to avoid steam to be fed under high pressure. In accordance with a preferred embodiment, the control device will stop the supply of steam through the supply conduct 12 automatically in case the predetermined pressure is not reached after a predetermined period, in order to restart the feeding cycle or to allow investigation as to the reasons why the cover 7 is not or not completely closed.

In accordance with a further embodiment of the invention, the control device is adapted to permit rotation of the pressure vessel only in case the output signal of the pressure sensing device 15 indicates that the preselected pressure has been reached.

In those embodiments having a pressure medium supply through a single conduct, the control device 14 is formed in such a manner that the throttle valve is first opened to provide a reduced cross-sectional area, in a first stage. Valve 18 is either closed or open during a short initial period. After the valve 18 has been closed for a predetermined period and the steam is supplied through the supply conduct, and when the cover 7 is closed, a pressure will be established within the pressure vessel corresponding to the pressure value as preset at the control device. When this pressure is reached and the pressure sensing device has delivered an output signal to the control device 14, the throttle valve is completely opened so that the final operating pressure will be established within the pressure vessel. However, in case the preset pressure value is not reached, the control device 14 will not deliver any signal for increasing the cross-sectional area of the supply conduct in order to prevent the pressure medium to be supplied through an increased cross-sectional area.

The above disclosed pressure vessel is particularly useful as a steam peeler or pressure cooker. However, its use is not restricted to steam peeling and pressure cooking.

What is claimed is:

1. A rotatably-supported pressure vessel having a feed opening at the top for receiving product to be treated, a normally-open cover, means for closing the cover to close the feed opening, a first pressure medium supply means embodying a control valve for supplying steam at low pressure to the interior of the vessel at the bottom thereof, a second pressure medium supply means embodying a control valve for supplying steam at high pressure to the interior of the vessel between the bottom and the top and control means including control circuitry for opening the valve for introducing low pressure steam into the vessel while the cover is open and for maintaining the valve for introducing high pressure steam closed, and pressure sensing means in the control circuitry characterized in that it is responsive only when the pressure within the vessel reaches said predetermined low pressure developed in the vessel when closed by the delivery of low pressure steam into the closed vessel for opening the valve for introducing high pressure steam into the closed vessel.

2. A rotatably supported pressure vessel having a feed opening of predeterined size for receiving product to be treated, a normally-open cover for closing the feeding opening, means for moving the cover to close the feed opening, first pressure medium supply means for supplying steam at a relatively low pressure to the interior of the vessel, second pressure medium supply means for supplying steam at a high pressure to the interior of the vessel, control means including control circuitry for supplying low pressure steam through said first pressure medium supply means to the vessel while the cover is open to expel ambient air and for inhibiting delivery of high pressure steam through said second pressure medium supply means into the vessel and pressure sensing means in the control circuitry characterized in that it is responsive to actuate the means for supplying steam to said second pressure medium supply means only when the pressure in the vessel reaches said predetermined low pressure.

3. A pressure vessel according to claim 2 wherein the feed opening has a cross-sectional area of approximately 400 millimeters and the first pressure medium supply means through which low pressure steam is delivered into the vessel has a cross-sectional area in the order of 30 millimeters.

4. A pressure according to claim 2 wherein the feed opening has a cross-sectional area of approximately 400 millimeters, the cross-sectional area of the first pressure medium supply means through which low pressure steam is delivered into the vessel has a cross section on the order of 30 millimeters and the second pressure medium supply means through which high pressure steam is delivered into the vessel has a cross section in the order of 125 millimeters.

5. A pressure vessel according to claim 2 wherein the low pressure is in the order of 1 atmosphere and the high pressure is in the order of 10 to 15 atmosphere.

6. A pressure vessel according to claim 2 wherein the control means provides for terminating delivery of steam through the first pressure medium supply means in the event that the pressure within the vessel fails to reach said predetermined level within a predetermined period.

7. A pressure vessel according to claim 2 wherein the control device inhibits rotation of the vessel in the event that the pressure-sensing device fails to be actuated.

8. A pressure vessel according to claim 2 wherein there is separate pressure-operable means for opening and closing the cover.

9. A pressure vessel according to claim 2 wherein there is a vent valve operable by said control means following initiating and delivery of low pressure steam into the vessel to be closed.

10. A pressure vessel according to claim 2 characterized in that the second pressure medium supply means supplies the expelling medium and the first pressure medium supply means supplies the actual pressure medium.

11. A pressure vessel according to claim 10 characterized in that the cross-sectional area of the second pressure medium supply means is significantly smaller than that of the first pressure medium supply means.

12. A pressure vessel according to claim 11 characterized in that said first pressure medium supply means is connected with a pressure source having a substantial lower pressure than the operating pressure.

13. A pressure vessel according to claim 11 wherein the first pressure medium supply means is connected to the pressure vessel by way of throttle means.

14. A pressure vessel according to claim 2 characterized in that the control means is designed to enable rotation of the pressure vessel only in the event that the output signal of the pressure measuring means previously indicated that the preselected pressure has been attained.

* * * * *